April 24, 1951 W. B. CRAWFORD 2,550,138
TANK FITTING
Filed July 10, 1947 2 Sheets-Sheet 1
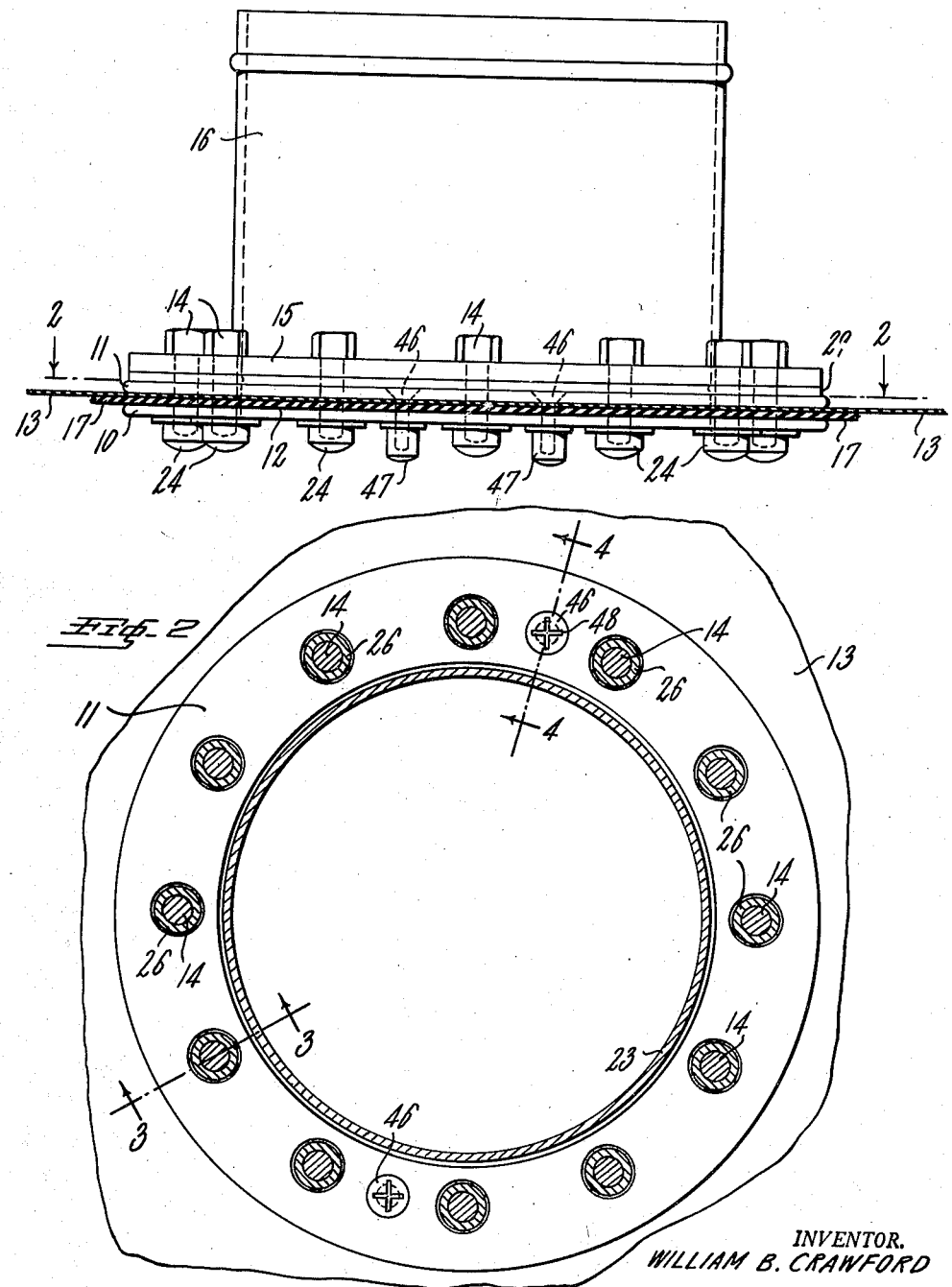
INVENTOR.
WILLIAM B. CRAWFORD
BY
William R. Epes
ATTORNEY

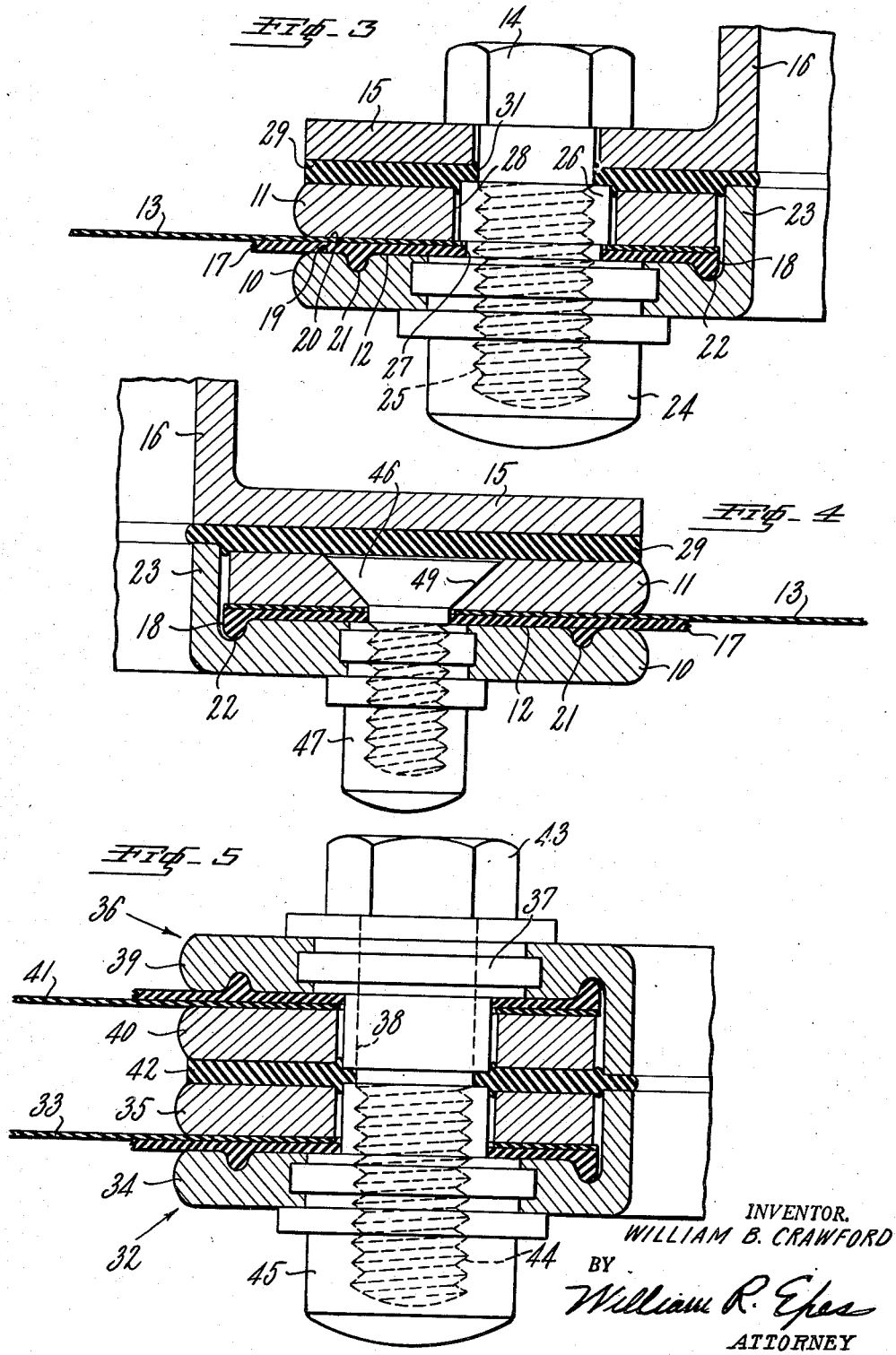

Patented Apr. 24, 1951

2,550,138

UNITED STATES PATENT OFFICE 2,550,138

TANK FITTING

William B. Crawford, South Bend, Ind., assignor to United States Rubber Company, New York, N. Y., a corporation of New Jersey Application July 10, 1947, Serial No. 759,950

7 Claims. (Cl. 285—25)

This invention relates to a tank fitting for an opening in a wall of a tank to which may be attached some form of a connection, such as an inlet or outlet pipe, or a closure for such opening, or a similar fitting on another tank for connecting the two tanks. The fitting is particularly applicable to fuel tanks having one or more layers of cold flowable rubber-like material covering the margin of its walls around the opening.

Heretofore tank fittings have been secured to the margins of the walls of the tanks around the openings by clamping such margins between two metal rings adapted to form a base to which connections may be secured. In such prior constructions the rubber-like layers after being clamped between the rings flowed as a result of its cold flow property and caused the original pressure applied thereto to be released to such an extent that a fluid tight seal between the fitting rings and the tank wall could not be maintained. Furthermore the rubber which flowed from between the rings formed a bead around the outer periphery of the rings. Such bead was located at the line of flexing between the flexible tank wall and the rigid fitting and thereby increased the stresses in the tank wall on that line when flexing occurred. Such stresses contributed to the failure of the tank.

In accordance with the construction of the tank fitting embodying the present invention, grooves are formed in the face of one of the clamping rings to receive and confine the cold flow of the rubber within the space provided between the rings. The clamping pressure is also applied at points around the periphery of the rings which are nearer to their inner peripheries than their outer peripheries. The control of the cold flow of the rubber by the grooves and the manner of applying the pressure eliminates the formation of the bead while sufficient clamping pressure is applied and maintained between rings to maintain a fluid tight seal.

The invention is further described in connection with the accompanying drawing, in which:

Fig. 1 is an elevational view of a tank fitting embodying this invention as it appears on a tank connected to an inlet, or outlet;

Fig. 2 is a plan view of the fitting taken on line 2—2 of Fig. 1;

Figs. 3 and 4 are cross sectional views taken on lines 3—3 and 4—4, respectively, of Fig. 2, but further showing the inlet connection attached to the fitting and Fig. 5 is a cross sectional view corresponding to Fig. 3 of tank fittings on separate tanks connected together by coupling the two fittings together.

As illustrated in the drawings, the tank fitting comprises an inner ring 10 and an outer ring 11 between which a margin 12 of an opening in the tank wall 13 is clamped by bolts 14, which extend through a flange 15 on an inlet connection 16, and also through the outer ring 11. The bolts 14 have a threaded connection with the inner ring 10, and thereby secure the rings to the margin 12 and the inlet connection 16 to the fitting with fluid tight joints. The tank is adapted to retain fuel oils therein, and its walls 13 are made of flexible rubber coated fabric having a layer 17 of rubber-like material subject to cold flow under pressure. The layer 17 of rubber-like material may be made of any of the usual oil resisting synthetic rubbers, and since it covers the margin 12 of the tank opening 18, it aids in forming a fluid tight seal between the rings 10 and 11. In the event the layer of rubber 17 is of insufficient thickness to form a good seal between the rings 10 and 11, a collar of similar rubber may be placed adjacent the ring 10.

As shown in Figs. 2 and 3 the inner and outer rings 10 and 11 have generally a disc shape, and the margin 12 of the opening in the tank wall 13 is sandwiched between the flat faces 19 and 20 of the rings. The rubber-like layer 17 on the inside of the tank wall 13 lies next to the face 19 of the inner ring 10, which is provided with circumferential grooves 21 and 22 into which the rubber layer 17 may flow under the pressure applied thereto between the rings 10 and 11. The inner ring 10 is provided with a flange 23 which extends outwardly and axially through the opening 18 in the walls of the tank, and terminate slightly above the outer flat face of the outer ring 11, whose inner periphery loosely fits around the flange 23. Domed nuts 24 are affixed to the flat portion of the ring 10, and they are provided with threaded bores 25 for receiving the threaded ends of the bolts 14. The shanks 26 of the nuts 24 extend outwardly from the face 19 of the inner ring and through openings 27 and 28 in the wall 13 of the tank and the outer ring 11, respectively, and above the upper face of the outer ring 11 substantially even with the top of the flange 23. The walls of the openings 28 in the outer ring fit loosely around the shanks 26.

A packing ring 29 is interposed between the outer ring 11 and the flange 15 on the outer connection 16. The openings 31 in the packing ring 29 have a smaller diameter than the outer diameter of the shanks 26 of the dome nuts, and its inner periphery overlaps the top of the flange 23 and thereby forms a fluid tight seal against leakage of fluid from the interior of the flange 23 and around the nut shanks 26 along the line formed by the bottom face of the packing ring 29. The flange 15 of the outlet connection 16 is placed adjacent to the ring 29, and when the whole assembly is drawn together by the bolts 14 fluid tight seals are also formed between the top of the packing ring 29 and the flange 15, and between the flat surfaces 19 and 20 of the inner and outer rings and the tank wall 13.

When the bolts 14 are turned down to tighten the joints, the clamping pressure applied to the fitting rings 10 and 11 radiates from the center of the bolts 14, and the greatest flow in the rubber layer 17 takes place in the areas nearest to the centers of the bolts, because the faces 19 and 20 of the fitting rings diverge outwardly from each other from the centers of the application of the pressures due to the lack of complete rigidly of the fitting rings. The flow of the rubber layer 17 outwardly from between the rings 10 and 11 in sufficient amounts to form a bead of rubber around the outer periphery of the inner ring 10 is prevented by taking advantage of the divergence of the faces 19 and 20 when the pressure is applied thereto and by locating the centers of the points of application of the pressures nearer the inner periphery than the outer periphery of the rings, thereby providing a longer path over which the rubber must flow before reaching the outer periphery of the inner ring. Accordingly the centers of the openings through which the bolts 14 pass are located closer the inner peripheries of the rings than to the outer peripheries. The flow of the rubber layer 17 towards the outer peripheries of the rings is also prevented by forming the peripheral groove 21 in the face 19 of the ring 10, thereby intercepting the flow of the rubber before it reaches the outer peripheries of the rings and providing a reservoir for such flow. The inner groove 22 also provides a reservoir for the flow of the rubber inwardly and prevents excessive pressure being exerted thereon to cause the rubber to flow outwardly. The flow of the rubber into the grooves 21 and 22 produces a better seal, because of the offset continuous ring of rubber compacted therein. The bead of rubber heretofore formed around the outer peripheries of the rings being eliminated, the flexible tank wall 15 may flex freely to either side of the plane of the faces 19 and 20 of the fitting rings without subjecting the walls to undue strain around such outer peripheries.

A second application of this invention is disclosed in Fig. 5. It comprises a connection between two tank fittings, one of which may be of the same design as that illustrated in Figs. 1 to 4, and the other of which is slightly modified, in that it is not provided with domed nuts, such as the nuts 24 previously disclosed. The fitting 32 is identical to the fitting previously described, and it has the tank wall 33 clamped between its inner and outer rings 34 and 35, respectively. The other fitting 36 is in all respects the same as the fitting 32, excepting that an insert 37 having a smooth bore 38 therethrough is substituted for the dome nuts 24. The latter fitting is provided with inner and outer fitting rings 39 and 40, between which the tank wall 41 is clamped. The fittings 32 and 36 are connected together by placing a packing ring 42 between the outer fitting rings 35 and 40 of the respective fittings, and clamping the fittings together by means of bolts 43 having their shanks 44 extending through the aligned openings in the respective parts and threaded into the dome nuts 45 of the opposite fitting.

The tank fittings shown in the drawings are initially clamped to the tank wall by means of two diametrically opposed flat head screws 46 (Figs. 2 and 4) which extend through the outer fitting ring and into domed nuts 47 secured to the inner fitting ring. The heads of the screws 46 are provided with screw driver slots 48 and they are received in counter-sunk, or tapered openings 49 in the outer fitting rings. The flat headed screws 46 hold the tank fitting rings in place on the margin of the opening until a connection can be attached to the fitting as by means of the screws 14, or until two such tank fittings can be connected together as shown in Fig. 5.

The fitting rings are preferably made of light metal, such as aluminum, and the domed nuts 24, 45, and the inserts 37 are preferably made of harder metal, such as steel to resist wear, and form strong threads for the reception of the threaded ends of the clamping bolts. In such case the metal of the rings are cast around the shanks of the nuts and inserts. Since the openings in the outer ring fit loosely over the shanks of the domed nuts and inserts, and its inner periphery fits loosely around the flanges of the inner fitting ring with considerable tolerance, all cost of machining the fitted parts may be eliminated.

Whereas the preferred forms of this invention have been described herein more or less in detail, it will be understood that changes may be made in the construction without departing from the spirit of this invention, or the scope of the appended claims.

Having thus described my invention, what I claim and desire to protect by Letters Patent is:

1. In combination with a tank, a fitting attached to the margin of an opening in the tank wall which contains a layer of rubber-like material subject to cold flow, said fitting comprising inner and outer rings clamped to either side of said margin, at least one of said rings having a plurality of openings spaced around and formed in its annulus, the center of each of said openings being located on a radius from the center of said ring at a point nearer its inner periphery than its outer periphery and said inner periphery being yieldable under pressure applied to the face of said ring, said margin having corresponding openings formed therein, and means extending through said openings and connected to said other ring for clamping said rings to said margin by applying pressure to said margin progressively from the inner periphery towards the outer periphery of said rings through the yieldability of said yieldable ring.

2. In combination with a tank, a fitting attached to the margin of an opening in the tank wall which contains a layer of rubber-like material subject to cold flow, said fitting comprising inner and outer rings clamped to either side of said margin, said outer ring having a plurality of openings spaced around and formed in its annulus, the centers of said openings being located nearer the inner periphery than the outer periphery of said rings, said inner ring having an axially projecting flange extending within the inner periphery of said outer ring, and bolts extending through said openings in said annulus and having threaded ends screwed into nuts cooperating with said inner ring for clamping said rings to said margin.

3. In combination with a tank, a fitting attached to the margin of an opening in the tank wall, said margin having a layer of cold flowable rubber on its inner face, said fitting comprising inner and outer rings which are adapted to be clamped to either side of said margin, said outer ring having a plurality of openings spaced around and formed in its annulus, said inner ring having threaded nuts secured thereto on centers coinciding with said openings in said outer rings, said inner ring having an outer and an inner groove formed in its inner face and located one on each side of the centers of said nuts, and means extending through said openings in the annulus of said outer ring, and screwed into said nuts for clamping said rings to said margin, and forcing said flowable rubber into said grooves to prevent it from flowing outside of the space between said rings.

4. In combination with a tank, a fitting attached to the margin of an opening in the tank wall, said margin having a layer of cold flowable rubber-like material on its inner surface, said fitting comprising inner and outer disc-like rings which are adapted to be clamped to either side of said margin, said outer ring having a plurality of openings spaced around and formed in its annulus, said inner ring having threaded nuts affixed thereto with their centers coinciding with the centers of said openings in said annulus of said outer ring, said inner ring having at least two spaced circumferential grooves formed on its face adjacent to said layer of cold flowable rubber-like material, the centers of said nuts being located between said grooves, an axially projecting flange formed on the inner periphery of said inner ring and extending into the inner periphery of the said outer ring, and bolts extending through said openings in said outer ring and margin, and threaded into said nuts for clamping said rings to said margin.

5. In combination with a flexible walled tank, a fitting attached to the margin of an opening in the tank, said margin having a layer of cold flowable rubber-like material on its inner surface, said fitting comprising inner and outer disc-like rings between which said margin is located, said outer ring having a plurality of spaced openings therein located nearer its inner periphery than its outer periphery, said margin having openings coinciding with said openings in said outer ring, said inner ring having threaded domed nuts affixed thereto with their centers coinciding with the centers of said openings in said outer ring and said margin, said inner ring having circumferential grooves in its face adjacent to said layer of cold flowable rubber-like material, at least one of said grooves being positioned on the outside of the centers of said nuts, an axially projecting flange formed on the inner periphery of said inner ring and extending into the inner periphery of said outer ring, and bolts extending through said openings in said outer ring and margin, and threaded into said nuts for clamping said rings to said margin.

6. In combination with a flexible walled tank, a fitting attached to the margin of an opening in the tank wall, said margin having a layer of cold flowable rubber-like material on its inner face, said fitting comprising inner and outer disc-like rings between which said margin is positioned, said inner ring having threaded domed nuts affixed thereto and having their open ends projecting above the face of said inner ring, said inner ring having an internal axially projecting flange, said outer ring having a plurality of openings formed in its face which are adapted to coincide with the projecting ends of said nuts, the peripheral surfaces of said openings and the inner periphery of said outer ring being fitted loosely around the projecting ends of said nuts and the projecting flange, respectively, on said inner ring, a disc shaped packing ring placed on the outer face of said outer ring and adapted to extend over said projecting flange on said inner ring, said packing ring having openings therein of a diameter smaller than the over-all diameter of the projecting ends of said nuts and having centers coinciding with the centers of said nuts, an exterior connection secured to said fitting by bolts extending through said connection, and threaded into said nuts for clamping the assembly to said margin of the tank wall opening.

7. In combination with a flexible walled tank, a fitting attached to the margin of an opening in the tank wall, said margin having a layer of cold flowable rubber-like material on its inner face, said fitting comprising inner and outer disc-like rings between which said margin is clamped, a plurality of domed nuts affixed to said inner ring and extending through its inner face, the centers of said nuts being located nearer the inner periphery of said ring than its outer periphery, an internal axially projecting flange on said inner ring, said outer ring having a plurality of openings formed therein, the walls of said openings and the inner periphery of said outer ring being fitted loosely around the projecting ends of said nuts and said flange, a disc-like packing ring fitted over said outer ring and having its inner periphery projecting over said flange, said packing ring having openings smaller than the outside diameter of the projecting ends of said nuts and the centers of said openings coinciding with the centers of said nuts, and an outer connection attached to said fitting by bolts extending through said connection and threaded into said nuts to clamp all of said parts to said margin of said tank.

WILLIAM B. CRAWFORD.

REFERENCES CITED

The following references are of record in the file of this patent:

UNITED STATES PATENTS

| Number | Name | Date |
| --- | --- | --- |
| 1,689,575 | Winn | Oct. 30, 1928 |
| 2,336,885 | Pepersack | Dec. 14, 1943 |
| 2,391,373 | Wickstrum | Dec. 18, 1945 |